Figures 1, 2:
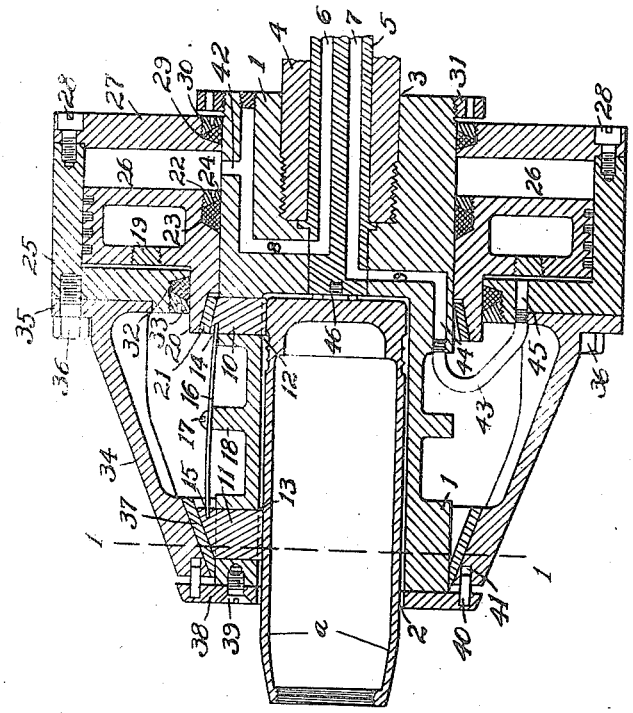

L. M. WHITE.
AIR OPERATED CHUCK.
APPLICATION FILED MAY 26, 1915.

1,180,355.

Patented Apr. 25, 1916.

WITNESSES:
L. S. Woodhull
N. E. Broesamle

INVENTOR
Lee M. White.
BY
B. S. Wheeler
ATTORNEY

UNITED STATES PATENT OFFICE.

LEE M. WHITE, OF DETROIT, MICHIGAN.

AIR-OPERATED CHUCK.

1,180,355.  Specification of Letters Patent.  Patented Apr. 25, 1916.

Application filed May 26, 1915. Serial No. 30,650.

*To all whom it may concern:*

Be it known that I, LEE M. WHITE, a citizen of the United States, residing at Detroit, in the county of Wayne, State of Michigan, have invented certain new and useful Improvements in Air-Operated Chucks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to chucks, especially to that class of chucks adapted to be operated by air pressure, and consists in the novel construction and arrangement of parts as hereinafter set forth and claimed.

The invention has for its object the provision of a simple and efficient air operated chuck for use in connection with machine lathes and the like, which will enable the rapid chucking and handling of work of fragile character, such as tubes, nipples, shells and other hollow cylindrical parts, subject to injury by the pressure of the gripping jaws of the chuck, and wherein the construction is such as to provide for the distribution and equalization of the pressure of the jaws upon the work so as to avoid injury thereto and insure the firm gripping and accurate centering of the work irrespective of variations in the diameter of the portions engaged by the chuck.

The above object is attained by the employment of a novel construction and arrangement of the gripping jaws and actuating means of the chuck, which briefly described comprises a plurality of radially movable jaws spaced apart in series and arranged to operate correlatively in gripping the work so as to support it at intervals circumferentially and longitudinally. The jaws of each series are actuated simultaneously by sliding contact with frusto-conical bearing rings carried respectively by a reciprocal piston and a reciprocal cylinder containing the piston. Air under pressure is applied to actuate the piston and cylinder in opposite directions and thereby impart movement to the jaws in a manner to equalize the pressure exerted on each series and effect a consequent uniform distribution of the crushing strain of the jaws upon the work being chucked.

The preferred form of embodiment of the features of the present invention is illustrated in the accompanying drawings, in which:

Figure 1 is a front end elevation of a chuck constructed in accordance with my invention, showing a piece of tubular work embraced by the jaws, the view being partly in section as on dotted line 1—1 of Fig. 2. Fig. 2 is a central vertical longitudinal section through the parts of the chuck and its carrying spindle of a lathe, as on dotted line 2—2 of Fig. 1.

Referring to the parts of the structure by the characters of reference marked on the drawings, the numeral 1 designates a cylindrical sleeve which has formed in one end an axial bore 2 of suitable depth and diameter to accommodate the work to be operated upon, as indicated at *a*. The opposite end of this sleeve is provided with an axial screw-threaded bore 3 which receives the screw-threaded end of a lathe spindle 4, upon which said sleeve is securely mounted to rotate with said spindle. It will be understood that the spindle 4 is journaled in the usual way in suitable bearings upon a lathe and connected with driving means by which it is rotated.

Extending axially through the spindle 4 and into the end of the sleeve 1, is a shaft 5 having air passages 6 and 7 which extend therethrough and communicate respectively with angular passages 8 and 9 formed in the body of the sleeve 1. The outer end of the shaft 5 is adapted for revolving connection in the usual way with a source of air supply under pressure and with a controlling valve by which the delivery of the air for actuating the chuck is controlled, as is the common practice in air operated chucks.

The sleeve 1 is provided with a plurality of gripping jaws arranged in two series, of preferably three jaws each, 10 and 11 respectively spaced longitudinally of the sleeve. The jaws of each series are uniformly spaced at intervals circumferentially of the sleeve in which they are mounted to slide radially in close fitting guide-ways 12 and 13 respectively formed through the wall of said sleeve. The opposed faces of the pairs of alined jaws of the two series are provided with transverse slots 14 and 15, respectively, for the reception of corresponding ends of a leaf spring 16 which is secured at its center by means of a screw 17 to a rib 18 formed on the sleeve 1. Said springs are arranged to exert an outward tension upon the jaws to normally retain their inner ends flush with the wall of the bore 2, and the outer ends of the jaws of the two series are formed with extremities reversely inclined to the axis of said sleeve.

Mounted concentrically on the sleeve 1 so as to slide axially thereon, is a piston head 19 having a laterally projecting annular hub or sleeve 20 on one side thereof, in the end of which a frusto-conical bearing ring or bushing 21 is rigidly seated so as to embrace and coincide with the correspondingly inclined extremities of the series of jaws 10. The opposite side of the piston head 19 is provided with a screw-threaded counterbore 22 forming a beveled shoulder therein against which a ring of packing material 23 is forced by means of a beveled annular nut 24 screwed therein and between which and said shoulder the packing is compressed and contracted about the sleeve to form an air-tight sliding connection with said sleeve.

Embracing the piston head 19 and the sleeve 1 concentrically, is a cylinder 25 having an air chamber 26 therein, in which said piston is suitably fitted to form an air-tight working connection with the cylinder wall, and which is closed at one end by a circular plate 27 recessed at its marginal edge to receive the cylinder wall to which it is secured by screws 28. Said plate is formed with a central aperture through which one end of the sleeve 1 extends and is provided with a packing ring 29 and binding nut 30, similar to that described for the piston, to form an air-tight sliding joint between the cylinder end and said sleeve. An annular nut 31 is secured by screw-threaded engagement upon the end of the sleeve 1 to serve as a stop for engagement with the plate 27 to limit the movement of the cylinder in one direction on said sleeve. The opposite end of the cylinder 25 is formed with a concentric aperture which slidably embraces the sleeve 20 of the piston and is provided with a packing ring 32 and binding nut 33, similar to that described for the piston, by which an air-tight working bearing is effected between the parts to permit of relative axial movement of said piston and cylinder.

The inner end of the cylinder 25 is extended to embrace the outer end of the sleeve 1 by means of a conical housing 34 having at its base a flange 35, through which bolts 36 are passed and threaded into the cylinder wall to secure said housing thereto. The reduced end of the housing 34 is provided interiorly with a fixed frusto-conical bearing ring 37 which slidably embraces the sleeve 1 at its forward end, and which also embraces upon its inner inclined face the correspondingly inclined extremities of the series of jaws 11, the inclination of which is reversed to that of the jaws 10 and the bearing ring 21 of the piston.

A circular plate 38, having a central aperture registering with the bore 2 of the sleeve 1, is rigidly secured to the end of said sleeve by screws 39 threaded therein, and projecting laterally from the inner face of said plate is a series of engaging pins 40 which extend freely into apertures 41 formed in the adjacent end of the housing 3. Said plate acts as a limiting stop to the forward movement of the cylinder by engagement with the end of the housing, and through the engagement of the pins 40 with the aperture 41 a fixed rotary driving and axially slidable connection is established between said sleeve and cylinder, causing them to rotate in unison.

Air is admitted to the chamber 26 of the cylinder upon one side of the piston through a port 42 communicating therewith and with the passages 8 and 6 through the body of the sleeve 1, and also to said chamber upon the opposite side of said piston through a flexible tubular connection 43 suitably connected at one end to a passage 44 communicating with the passages 9 and 7 through the body of said sleeve, and which is connected at its opposite end to a port 45 communicating with the chamber 26 through the inner wall of said cylinder. The port 42 is so positioned as to maintain communication with the chamber 26 irrespective of the shifting of positions of the piston and cylinder axially of the sleeve, while the tubular connection 43 permits of the relative movement of the piston and cylinder and maintains communication with said chamber upon the opposite side of said piston.

An adjusting screw 46, which serves as a depth gage, is mounted in the end wall of the bore 2 so as to engage the end of the work $a$ to be operated upon and limits its depth of entrance within said bore.

The parts being thus constructed and arranged, the operation of the chuck will be as follows: The work $a$ is placed in position within the bore 2 as shown in Fig. 2. Air under pressure is then admitted, by means of the usual control valve, not shown, to the passages 6 and 8 and through the port 42 to the chamber 26, wherein the pressure will be exerted upon the piston and cylinder so as to impart axial movement thereto in opposite directions. The movement of the piston in one direction through frictional engagement of its inclined bearing ring 21 with the corresponding extremities of the jaws 10 will move said jaws radially under a wedging force against the tension of the spring 16 and into a firm gripping contact upon the work at their inner ends. The movement of the cylinder in the opposite direction will likewise impart movement to the jaws 11 through the wedging contact of the inclined bearing ring 37 with the inclined extremities of said jaws in a manner to force them into gripping contact with the work under pressure substantially equal to that exerted upon the jaws 10, that is where the degree of inclination of the bearing rings 21 and 37 is uniform. By varying the relative inclination of these rings the wedging force exerted upon the jaws may be regulated accordingly to increase or decrease the pressure on either of the series of jaws to accommodate work requiring more or less pressure at one point than at another.

The work when locked by the jaws, as shown in Fig. 2, will be retained in such position during the dwell of the established connection of the chamber 26 with the air pressure through the passage 6, and may be released by actuating the air controlled valve, before referred to, so as to cut off the passage 6 and admit the compressed air to the passages 7, 9 and 44, and through the flexible tube 43 and port 45 to the chamber 26, wherein the pressure will be delivered upon the opposite end of the piston and cylinder, causing them to recede in reverse directions and release their respective bearing rings from wedging engagment with the corresponding sets of jaws. The outward tension of the springs 16 exerted on said jaws will retain them in contact with their respective rings and cause them to withdraw from engagement with the work which will then be released and may be removed from the chuck. It will be understood that the chuck may be constantly driven and that the operations of chucking and releasing the work may be effected without necessitating the retarding or stopping of the chuck.

The invention is presented as including all such changes and modifications as come within the scope of the following claims.

I claim:

1. In a chuck, the combination of a spindle, a hollow sleeve secured thereto, a plurality of chuck jaws spaced in adjacent series and mounted to move radially in said sleeve, a piston mounted to move axially on said sleeve and having a frusto-conical bearing ring slidably engaging the jaws of one of said series, a cylinder embracing said piston and said sleeve mounted to slide axially thereon and carrying a frusto-conical bearing ring slidably engaging the jaws of the other of said series, means for conducting a pressure medium to said cylinder to impart axial movement to said piston and said cylinder in opposite directions and transmit inward movement simultaneously to the jaws of both of said series, and means for exerting a constant outward yielding tension on said jaws.

2. In a chuck, the combination of a spindle, a hollow sleeve secured at one end thereto, a plurality of chuck jaws spaced in adjacent series and mounted to move radially in said sleeve, a piston mounted to move axially on said sleeve and carrying a bearing ring inclined to the axis of said sleeve and engaging the outer extremities of the jaws of one of said series, a cylinder embracing said piston and sleeve mounted to slide axially thereon and carrying a bearing ring inclined to the axis of said sleeve in opposed relation to the bearing ring of said piston and slidably engaging the jaws of the other of said series, means for conducting a pressure medium to opposite ends of said cylinder to actuate said piston and cylinder alternately in opposite directions respectively to impart inward movement simultaneously to the jaws of both of said series and to permit said jaws to move outwardly, and means carried by said sleeve for exerting a constant outward yielding tension on said jaws.

3. In a chuck, the combination of a spindle, a hollow sleeve secured at one end thereto, a plurality of chuck jaws spaced in adjacent series and mounted to move radially in said sleeve, said jaws having their outer extremities inclined to the axis of said sleeve in reverse direction with respect to said series, a piston mounted to move axially on said sleeve and carrying an inclined bearing ring corresponding to and slidably engaging the inclined extremities of the jaws of one of said series to move them inwardly with the movement of said piston in one direction, a cylinder embracing said piston and sleeve mounted to slide axially thereon and carrying a bearing ring correspondingly inclined to and slidably engaging the inclined extremities of the jaws of the other of said series to move them inwardly through the movement of said cylinder in one direction, means extending through said spindle and sleeve for conveying a pressure medium to said cylinder to impart relative axial movement to said piston and cylinder in opposite directions, and means carried by said sleeve and engaging said jaws for exerting a constant outward yielding tension thereon.

4. In a chuck, the combination of a spindle, a hollow sleeve secured at one end thereto, a plurality of chuck jaws spaced in adjacent series and mounted to move radially in said sleeve, a piston mounted to move axially on said sleeve and carrying a bearing ring inclined to the axis of said sleeve and engaging the extremities of the jaws of one of said series to move them inwardly with the movement of said piston in one direction, a cylinder embracing said piston and sleeve mounted to slide axially thereon and carrying a bearing ring inclined to the axis of said sleeve in a reverse direction to the incline of the ring of said piston and slidably engaging the extremities of the jaws of the other of said series to move them inwardly with the movement of said cylinder in one direction, means carried by said sleeve for limiting the movement of the cylinder thereon, means extending through said spindle and sleeve to establish independent communication with opposite ends of said cylinder for conveying a pressure medium thereto to impart relative axial movement to said piston and cylinder, means mounted on said sleeve and connecting opposed pairs of jaws of said series for exerting a constant outward yielding tension thereon to retain said jaws in sliding contact with their respective bearing rings.

5. In a chuck, the combination of a spindle, a hollow sleeve secured at one end thereto, a plurality of chuck jaws spaced in adjacent series and mounted to move radially in said sleeve, a piston mounted to move axially on said sleeve, the outer extremities of the jaws of each series being oppositely inclined to the axis of said sleeve, a piston concentric with said sleeve mounted to slide axially thereon and carrying a bearing ring correspondingly inclined to the inclined extremities of one of the series of jaws with which said ring engages to force said jaws inwardly with the movement of said piston in one direction, a cylinder concentrically embracing said piston and sleeve to slide axially thereon and carrying a bearing ring correspondingly inclined to the inclined extremities of the other series of said jaws with which said ring slidably engages to force said jaws inwardly with the movement of said cylinder in the opposite direction to that of said piston, means carried at opposite ends of said sleeve to limit the movement of said cylinder thereon, spring members carried by said sleeve and engaging opposed pairs of said jaws for retaining said jaws in sliding contact with their respective bearing rings, independent means extending through said spindle and sleeve for establishing independent communication with said cylinder upon opposite sides of said piston for conveying a pressure medium thereto to actuate said piston and cylinder alternately in opposite directions to impart radial movement simultaneously to the jaws of said series.

In testimony whereof, I sign this specification in the presence of two witnesses.

LEE M. WHITE.

Witnesses:
B. F. WHEELER,
M. E. BROESAMLE.